Nov. 22, 1927.  
C. W. OLSON  
1,649,850  
ROTATABLE WINDOW  
Filed Feb. 23, 1926

Inventor  
CARL W. OLSON  
By Paul, Paul & Moore  
ATTORNEYS

Patented Nov. 22, 1927.

1,649,850

UNITED STATES PATENT OFFICE.

CARL W. OLSON, OF MINNEAPOLIS, MINNESOTA, ASSIGNOR TO AMERICAN SAFETY EQUIPMENT CORPORATION, OF MINNEAPOLIS, MINNESOTA, A CORPORATION OF DELAWARE.

ROTATABLE WINDOW.

Application filed February 23, 1926. Serial No. 89,982.

This invention relates to new and useful improvements in windows which are rotatably mounted for the purpose of removing by centrifugal force, all foreign materials or particles such as snow, sleet, rain, etc., which tend to accumulate thereon and thus obscure vision therethrough and is an improvement upon this form shown in my prior pending application Serial No. 703,004 filed March 29, 1924.

An object of this invention is to provide a rotatable window particularly adapted for use in connection with the usual windshield of an automobile or other vehicle, to prevent atmospheric elements and other materials from accumulating upon a portion thereof, thereby maintaining a clear and unobstructed vision through such portion regardless of weather conditions.

Features of the invention are; to provide such a device of comparatively light weight and construction, comprising a circular frame having a cushioned edge adapted to be clamped against the outer surface of the windshield, thereby providing substantially a dead-air space between the windshield and the rotatable disc of the device; to provide a supporting frame of comparatively small cross-section which will not impair or interfere with the driver's vision, when the device is left permanently mounted upon the vehicle and atmospheric conditions are clear; mounting the driving member at an angle relative to the transparent disc, and in such a manner as to have its outer face engage the adjacent outer face of the disc and not the peripheral edge thereof, thereby assuring better frictional driving engagement between member and disc, and also overcoming disadvantages resultant from lack of circular uniformity in cutting the glass disc; loosely mounting the driving member upon the motor shaft and yieldably securing it thereto to minimize strains caused by sudden starting torque; to demountably and adjustably mount the motor or driving means upon the supporting frame so that it may readily and quickly be removed for repairs or other purposes, and also whereby the angular driving engagement of the driving member with the rotatable disc may be relatively adjusted to obtain the desired degree of frictional driving engagement between member and disc; and to provide a clear-vision rotatable window of simple and inexpensive construction which may be manufactured at a minimum cost, and which may also be quickly mounted upon or attached to the windshield of a vehicle.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
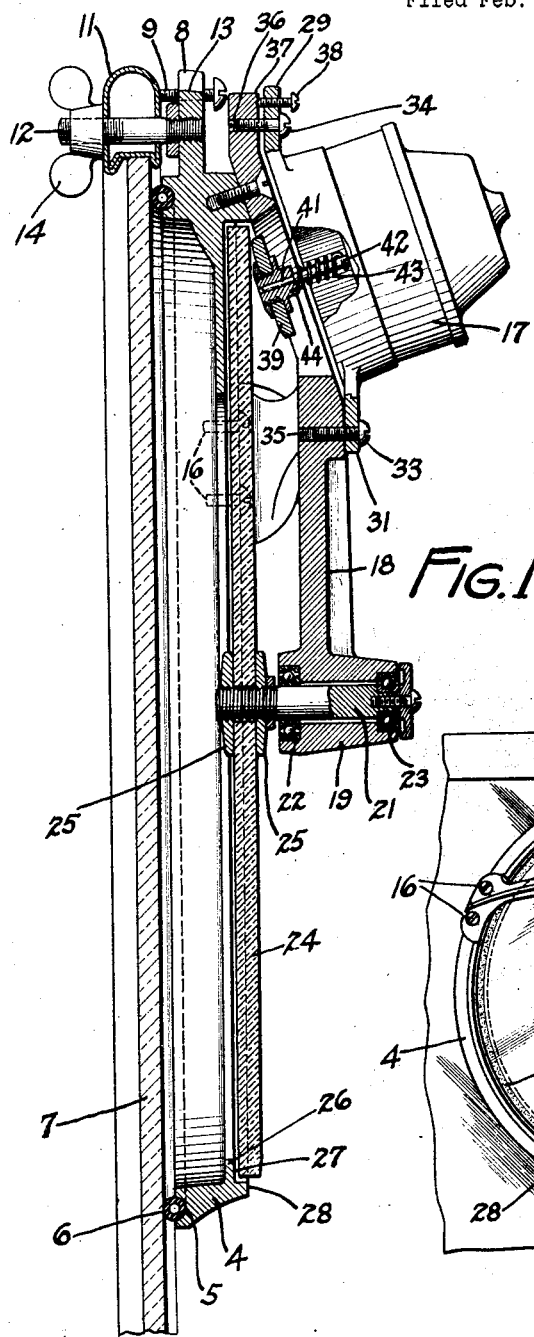
Figure 1 is a sectional elevation of the invention as mounted upon the windshield of a vehicle.
Figure 3:
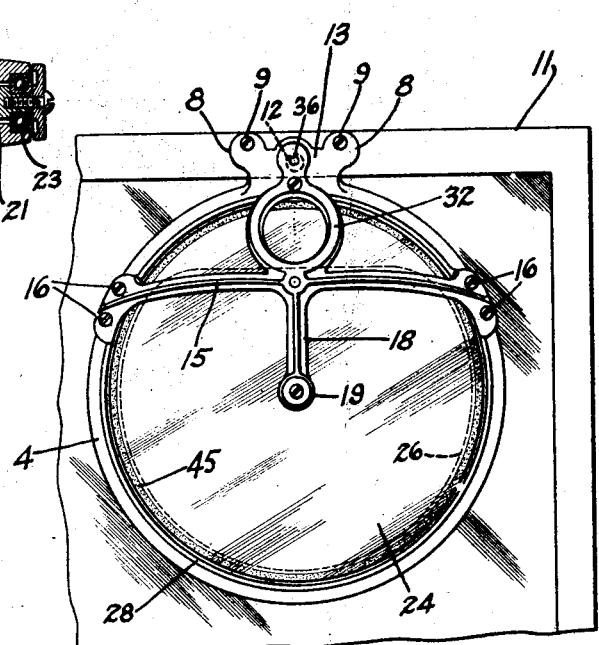
Figure 3 is a front view of Figure 1 with the motor removed.

The novel device featured in this invention comprises a ring-like frame 4 having an annular groove 5 provided in one side thereof adapted to receive a flexible gasket 6 adapted to be pressed against the windshield 7 when the device, as a whole, is mounted thereon as shown in Figures 1 and 3. Lugs 8 are provided on the upper portion of the frame 4 and have threaded apertures for receiving screws 9 adapted to be terminally engaged with the frame 11 of the windshield, when the device is mounted thereon as shown in Figure 1.

A stud 12 has one end secured to the flanged portion 13 between the lugs 8. This stud is adapted to be received in an aperture provided in the frame 11 of the windshield, and has its opposite end threaded to receive a wing nut 14 for securing or clamping the device to the windshield. The stud 12 is preferably located at a lower level than the screws 9, as is clearly shown in Figures 1 and 3, thereby causing the circular frame 4 to be drawn or clamped against the windshield 7 when the wing nut 14 is tightened. The screws 9 are adapted to bear against the frame 11 of the windshield and afford a means for adjusting the upper end of the circular frame 4 so as to cause the flexible gasket 6 to bear against the windshield its entire circumference. The device may be quickly and conveniently demounted from the windshield by simply unscrewing the wing nut 14 and lifting the frame 4 therefrom.

A bracket 15 is preferably secured to the circular frame 4 by means of screws 16. This bracket overhangs a portion of the central opening in the frame 4, and provides means for supporting a driving device such as the motor 17 shown in Figure 1. A depending arm 18 is provided on the bracket 15 and has a hub 19 axially aligned with the central opening in the frame 4 as shown. A stud 21 is rotatably and demountably mounted in the hub 19 upon suitable anti-friction bearings 22 and 23. Upon this stud is mounted a transparent disc 24 which disc is secured thereto by means of threaded washers 25. The diameter of the disc 24 is such as to cover the central opening in the frame 4. An inwardly extending annular flange 26 is integrally formed upon the frame 4 and functions to provide an annular recess 27 adapted to loosely receive the marginal edge of the disc. (See Figure 1.) The depth of the annular recess 27 and also the thickness of the disc 24 are such that when the disc is mounted as shown in Figure 1, the outer edge 28 of the frame 4 will be below the plane of the outer surface of the disc 24, thereby allowing foreign material engaging the disc to be centrifugally thrown therefrom.

Figure 2:
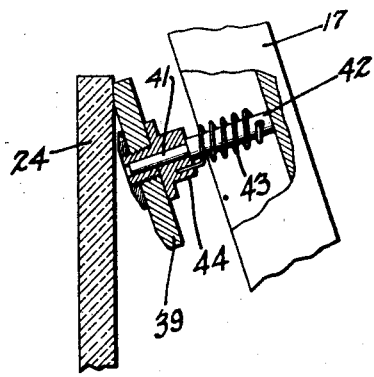
Figure 2 is an enlarged detail sectional view showing the angular position of the driving member with respect to the rotatable window or disc.

The means provided for rotating the transparent disc 24 is shown in Figures 1 and 2. A small electric motor 17 having oppositely extending lugs 29 and 31 formed on the casing thereof, is demountably secured to the upper circular portion 32 of the bracket 15 by such means as screws 33 and 34. The lower screw 33 is received in a threaded socket 35 provided in the central portion of the bracket, while the upper screw 34 is adjustably mounted in the threaded socket 36 provided in a lug 37 integrally formed with the portion 32 of the bracket 15. An adjusting screw 38 is also mounted in the lug 29 to terminally engage the lug 37 to relatively adjust the motor and its driving element relative to the disc 24. The circular portion 32 of the bracket 13 is preferably disposed at an incline relative to the annular recess 27, the purpose of which will be subsequently explained.

The driving element of the motor 17 consists of a flexible circular member 39 preferably of expandible material such as rubber. This member is loosely mounted upon the reduced end portion 41 of the motor shaft 42, and is yieldably connected thereto by means of a torsion spring 43 having one end secured to the motor shaft 42 and its opposite end secured to the hub 44 of the driving member 39. As a result of the circular portion 32 of the bracket 15 being inclined as above described, the driving member 39, when the motor 17 is mounted upon the bracket 15, will be angularly disposed relative to the outer face of the transparent disc 24 as shown in Figures 1 and 2. The adjusting screw 38 in the upper lug 29 of the motor housing affords means whereby the driving member 39 of the motor may be moved to or from the outer face of the disc 24 for the purpose of varying the frictional driving engagement between disc and member.

When the motor 17 is not functioning or is at rest, the driving member 39 will be contracted and will be out of engagement with the adjacent outer face 24 as shown in Figure 1. As soon, however, as current is supplied to the motor 17, the member 39 will commence to rotate and will be radially expanded by centrifugal force until it engages the adjacent face of the disc as shown in Figure 2. When the member 39 thus engages the disc 24, a rotary movement will be imparted thereto which will gradually be accelerated until maximum speed is reached. By the employment of the torsion spring 43 operatively connecting the driving member 39 with the motor shaft 42, all sudden torque strains will be substantially eliminated from the motor shaft 42. Also by mounting the driving member 39 so as to engage the outer face of the disc 24 as shown in Figure 2, all disadvantages resultant from lack of circular uniformity in cutting the disc will be overcome. If desired, the outer marginal edge of the disc 24 may be slightly roughened as indicated at 45 in Figure 3, thereby providing a better frictional driving engagement between the driving member 39 and the disc when the device is functioning. The conformation of the frame 4 and the bracket 15 is also such as to obscure very little of the driver's vision, thereby providing such a device which, if desired, may be left permanently mounted upon the windshield of the vehicle. The device is mounted upon the outside of the windshield so that foreign material such as snow, sleet, rain, etc. engaging therewith will be centrifugally thrown therefrom, thereby maintaining a clear vision for the driver of the vehicle through that portion of the windshield adjacent the disc 24. It will also be noted by reference to Figure 1, that the disc is spaced from the windshield 7, thereby providing substantially a dead air space functioning as a means to prevent the accumulation of frost upon the windshield, resulting from different temperatures between the exterior and interior of the vehicle. An added advantage is also obtained by mounting the motor 17 at an incline with respect to the vertical plane of the transparent disc 24, in that shocks and jolts transmitted to the windshield, as a result of the vehicle wheels engaging bumps in the roadway, will be transmitted to the bearings of the motor at an acute angle and not at right angles thereto, thus minimizing strains on the bearings.

I claim as my invention:

1. A device of the class described, including a rotatably mounted disc of transparent material, a driving element for the disc rotatably mounted adjacent the periphery thereof, and said disc-driving element being formed of expandible material whereby, upon rotation of the element, it will expand radially and engage the face of the disc and gradually accelerate said disc, thereby minimizing the starting torque upon the driving means.

2. A device of the class described, comprising in combination, a circular frame of comparatively small cross section, a transparent disc rotatably mounted therein, a driving device also mounted upon said frame and having a driving element engageable with said disc to rotate it, the axis of said driving element being arranged at an incline with respect to the axis of said disc whereby, upon actuation of said driving device, a portion of the face of said driving element will be moved into frictional driving engagement with the face of said disc.

3. A device of the class described, comprising in combination, a frame, a transparent disc rotatably mounted therein, a disc-driving device also mounted upon said frame and having a driving element adapted to engage said disc adjacent its periphery, said driving element having a yieldable connection with said driving device, whereby starting torque strains upon said driving device will be minimized.

4. A device of the class described comprising in combination, a frame having means for securing it to a stationary window, a transparent disc rotatably mounted in said frame, an electric motor also mounted upon said frame for driving said disc, a disc-like driving member of expandible material loosely mounted upon the shaft of said motor and adapted to be moved into frictional driving connection with said disc when said motor is operated, said driving member having a yieldable connection with said motor shaft whereby sudden starting torque strains upon said motor will be minimized.

5. The combination with a vehicle windshield, of a frame having a central aperture therein, a bearing axially disposed upon said frame and secured thereto, a stud rotatably mounted in said bearing, a transparent disc demountably secured to one end of said stud and rotatable therewith, an electric motor for driving said disc, the axis of said motor being arranged at an incline with respect to the axis of said disc, a driving member, of expandible material, mounted upon the shaft of said motor and adapted for relative movement thereon against the tension of a spring, and said driving member normally being out of frictional engagement with said disc, but adapted upon actuation of said motor, to radially expand and engage said disc to gradually accelerate it to full speed.

6. The combination with a vehicle windshield, of a circular frame having a central aperture therein, clamping means for adjustably and abuttingly securing said frame to said windshield, an annular recess in the outer side of said frame, an arm secured to said frame and overhanging said central aperture, a stud rotatably mounted in said arm, a transparent disc terminally secured to said stud and loosely disposed within said annular recess, a driving device for said disc adjustably and demountably secured to said frame, the drive shaft of said driving device being arranged at an incline relative to the axis of said disc, a disc-like driving member of expandible material loosely mounted upon said drive shaft and having a yieldable driving connection therewith, and said driving member being disposed so that a portion of its outer face will frictionally engage the adjacent face of said disc adjacent its periphery, thereby gradually accelerating the rotation of said disc without exerting unnecessary torque strains upon said driving means.

7. A windshield comprising a frame having a window pane, an annulus having one side sealingly engaged with the pane at the outer side, said annulus suspendingly connected by its top only to the frame, a skeleton frame connected to and disposed entirely and well above the center of the annulus and having a narrow extension reaching downwardly to the center of the annulus, and a transparent disk rotatably supported only by the extension and arranged adjacent the open side of said annulus.

8. A windshield comprising a frame having a window pane, an annulus having one side sealingly engaged with the pane at the outer side, said annulus suspendingly connected by its top only to the frame, a skeleton frame connected to and disposed entirely and well above the center of the annulus and having a narrow extension reaching downwardly to the center of the annulus and a transparent disk rotatably supported only by the extension and arranged adjacent the open side of said annulus, and a motor swingingly mounted on said skeleton frame at its uppermost portion, and having a driving element arranged to drive the transparent disk, and means for adjusting the motor toward and away from the skeleton frame.

9. In combination with a windshield, an annulus suspendingly connected only by its top to the top frame portion of the windshield, said annulus engaging the front face of the shield, means above the point of attachment of the annulus to operate the annulus as a lever about the point of attachment as a fulcrum to forcibly sealingly engage its inner face against the shield, a frame arranged entirely above the central portion of the annulus at the front thereof and having a narrow downward extension, a transparent disk rotatably supported at the lower extremity of the extension and arranged adjacent the front side of the annulus to prevent entrance of water but to permit circulation of air within the annulus.

10. In combination with a windshield, an annulus suspendingly connected only by its top to the top frame portion of the windshield, said annulus engaging the front face of the shield, means above the point of attachment of the annulus to operate the annulus as a lever about the point of attachment as a fulcrum, to forcibly sealingly engage its inner face against the shield, a frame arranged entirely above the central portion of the annulus at the front thereof and having a narrow downward extension, a transparent disk rotatably supported at the lower extremity of the extension and arranged adjacent the front side of the annulus to prevent entrance of water but to permit circulation of air within the annulus, and a driving mechanism swingingly attached to the frame and including a motor and a friction element operable by the motor shaft, to rotate the disk, the motor being arranged so that its weight tends to force the annulus against the window.

11. In combination with a windshield, an annulus suspendingly connected to the top frame portion of the windshield, means above the point of attachment of the annulus to operate the annulus as a lever about the point of attachment as a fulcrum to engage its inner face against the shield, a skeleton frame arranged entirely above the central portion of the annulus at the front thereof and having a narrow downward extension, a transparent disk rotatably supported at the lower extremity of the extension and arranged adjacent the front side of the annulus to prevent entrance of water but to permit circulation of air within the annulus, and a driving mechanism arranged at the top of the frame and including a motor and a friction element operable by the motor shaft, to rotate the disk, the weight of the motor tending to force the annulus against the window, and the motor being swingingly mounted upon the skeleton frame, and having means for adjustably swinging the motor to obtain proper driving relation with the disk.

12. In combination with a vehicle windshield of an annulus connected to and suspended from the top of the shield, and means above the point of attachment to engage the frame of the shield to cause the inner surface of the annulus to firmly engage against the glass, a skeleton frame attached to the annulus, well and only above its horizontal center, and a transparent disk rotatably supported by the frame and closing the outer side of the disk to the entrance of moisture but allowing circulation of air between said disk and the interior of said annulus.

13. In combination with a vehicle windshield of an annulus suspendingly attached from the top of the windshield and engaging its outer surface, a skeleton frame suspendingly attached to the first mentioned frame and disposed only at the upper portion of said frame, a transparent disk rotatably supported by the skeleton frame to close the annulus against the entrance of moisture but to allow circulation of air within the annulus around the disk, a motor mounted on said skeleton frame and having a driving element, traversing the frame and arranged to engage the transparent disk upon its outer surface adjacent its periphery, and means for adjusting the motor toward and away from its supporting frame.

In witness whereof, I have hereunto set my hand this 16th day of February, 1926.

CARL W. OLSON.